(12) United States Patent
Cariou et al.

(10) Patent No.: US 12,166,698 B2
(45) Date of Patent: Dec. 10, 2024

(54) ENHANCED BANDWIDTH SELECTION FOR WIRELESS COMMUNICATION DEVICES

(71) Applicant: Intel Corporation, Santa Clara, CA (US)

(72) Inventors: Laurent Cariou, Milizac (FR); Nir Balaban, Kfar Netter (IL); Daniel Bravo, Portland, OR (US); Dor Chay, Haifa (IL); Xiaogang Chen, Portland, OR (US); Feng Jiang, Santa Clara, CA (US); Thomas J. Kenney, Portland, OR (US); Qinghua Li, San Ramon, CA (US); Ehud Reshef, Qiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 400 days.

(21) Appl. No.: 17/094,779

(22) Filed: Nov. 10, 2020

(65) Prior Publication Data
US 2021/0067285 A1    Mar. 4, 2021

Related U.S. Application Data

(60) Provisional application No. 62/933,704, filed on Nov. 11, 2019.

(51) Int. Cl.
*H04L 5/00* (2006.01)
*H04L 27/26* (2006.01)
*H04W 74/0816* (2024.01)

(52) U.S. Cl.
CPC .......... *H04L 5/0007* (2013.01); *H04L 5/0053* (2013.01); *H04L 27/2613* (2013.01); *H04W 74/0816* (2013.01)

(58) Field of Classification Search
CPC ... H04L 5/0007; H04L 5/0005; H04L 5/0008; H04L 5/001; H04L 5/0012; H04L 5/0053; H04L 5/0055; H04L 5/0057; H04L 5/0048; H04L 27/2613; H04L 27/262; H04L 25/0226; H04W 74/0816
See application file for complete search history.

(56) References Cited

U.S. PATENT DOCUMENTS

2015/0236931 A1\* 8/2015 Merlin ............... H04L 1/0028
                                                    370/241
2016/0164646 A1\* 6/2016 Kwon ................ H04L 43/16
                                                    370/252

(Continued)

*Primary Examiner* — Ian N Moore
*Assistant Examiner* — Brian T Le
(74) *Attorney, Agent, or Firm* — Eversheds Sutherland (US) LLP

(57) ABSTRACT

This disclosure describes systems, methods, and devices related to enhanced bandwidth selection for wireless devices. A device may generate a request frame with at least one of a first indication of a bandwidth for which a second device is to measure a first noise level or a second indication of a resource unit for which the second device is to measure a second noise level. The device may send the request frame to the second device. The device may identify a response frame received from the second device, the response frame having a third indication of the first noise level or the second noise level and a fourth indication of the bandwidth or the resource unit. The device may determine, based on the first noise level or the second noise level, a parameter associated with a subsequent frame to send to the second device.

20 Claims, 11 Drawing Sheets

(56) References Cited

U.S. PATENT DOCUMENTS

2017/0070914 A1\* 3/2017 Chun ................... H04L 1/0075
2017/0279568 A1\* 9/2017 Huang .................. H04L 5/005
2019/0182845 A1\* 6/2019 Xue .................... H04W 72/542

\* cited by examiner

ENHANCED BANDWIDTH SELECTION FOR WIRELESS COMMUNICATION DEVICES

CROSS-REFERENCE TO RELATED APPLICATION(S)

This application is related to and claims priority to U.S. Provisional Patent Application No. 62/933,704, filed Nov. 11, 2019, which is hereby incorporated herein by reference in its entirety.

TECHNICAL FIELD

This disclosure generally relates to systems and methods for wireless communications and, more particularly, to bandwidth selection for wireless communication devices.

BACKGROUND

Wireless devices are becoming widely prevalent and are increasingly communicating with multiple devices. The Institute of Electrical and Electronics Engineers (IEEE) is developing one or more standards that utilize transmissions between wireless devices.

DETAILED DESCRIPTION

Figure 1A:
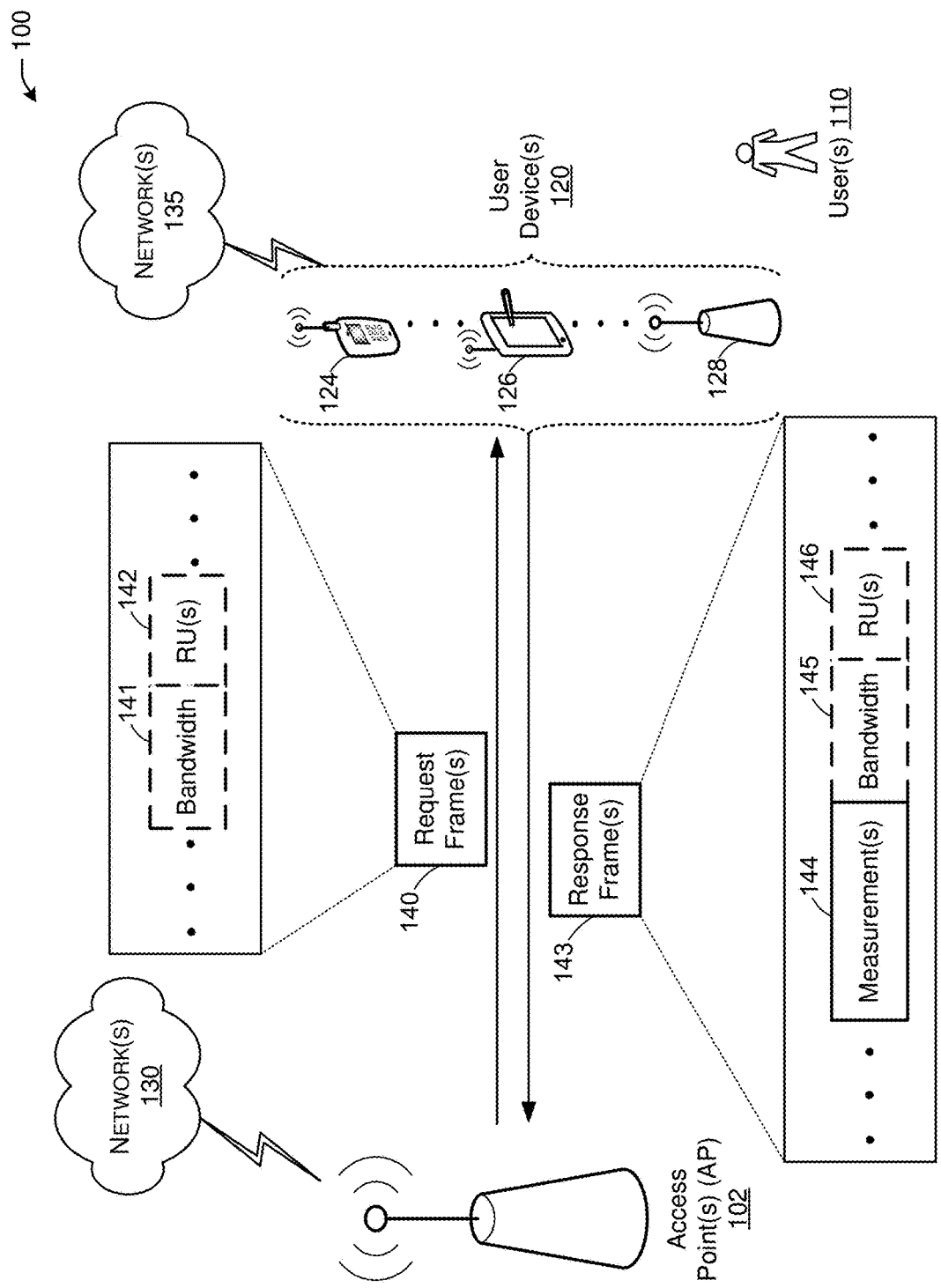
FIG. 1A is a network diagram illustrating an example network environment, in accordance with one or more example embodiments of the present disclosure.

Example embodiments described herein provide certain systems, methods, and devices for bandwidth selection for wireless communication devices. The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

The IEEE 802.11 technical standards define a way for wireless devices to select bandwidth to use in wireless communications. For example, the IEEE 802.11 technical standards define a dynamic bandwidth selection based on an exchange of request-to-send (RTS) and clear-to-send (CTS) frames (e.g., an RTS-CTS exchange) in which one device (e.g., an initiator) may send an RTS frame to a responder device, and when certain conditions are satisfied, the responder device may respond by sending a CTS frame to the initiator. In particular, a Very High Throughput (VHT) station device (STA) that is addressed by an RTS frame (e.g., receives an RTS frame addressed to the VHT STA) in a high-throughput (non-HT) or non-HT duplicate physical layer (PHY) protocol data unit (PPDU) that has a bandwidth signaling transmitter address (TA) and that has the RXVECTOR parameter DYN_BANDWIDTH_IN_NON_HT equal to Static behaves as follows: If the device's network allocation vector (NAV) indicates idle and clear channel assessment (CCA) has been idle for all secondary channels (e.g., a secondary 20 MHz channel, a secondary 40 MHz channel, and a secondary 80 MHz channel) in the channel width indicated by the RTS frame's RXVECTOR parameter CH_BANDWIDTH_IN_NON_HT for an interframe space (IFS) prior to the start of the RTS frame, then the STA shall respond with a CTS frame carried in a non-HT or non-HT duplicate PPDU after an interframe space. The CTS frame's TXVECTOR parameters CH_BANDWIDTH and CH_BANDWIDTH_IN_NON_HT shall be set to the same value as the RTS frame's RXVECTOR parameter CH_BANDWIDTH_IN_NON_HT. Otherwise, the STA shall not respond with a CTS frame.

The IEEE 802.11 technical standards also provide: A VHT STA that is addressed by an RTS frame in a non-HT or non-HT duplicate PPDU that has a bandwidth signaling TA and that has the RXVECTOR parameter DYN_BANDWIDTH_IN_NON_HT equal to Dynamic behaves as follows: If the NAV indicates idle, then the STA shall respond with a CTS frame in a non-HT or non-HT duplicate PPDU after an interframe space. The CTS frame's TXVECTOR parameters CH_BANDWIDTH and CH_BANDWIDTH_IN_NON_HT shall be set to any channel width for which CCA on all secondary channels has been idle for a PIFS prior to the start of the RTS frame and that is less than or equal to the channel width indicated in the RTS frame's RXVECTOR parameter CH_BANDWIDTH_IN_NON_HT. Otherwise, the STA shall not respond with a CTS frame.

The IEEE 802.11ax technical standard has defined the following bandwidth query report (BQR) mechanism: A non-access point (non-AP) STA may send bandwidth query reports (BQRs) to assist its AP in allocating downlink (DL) multi-user (MU) and uplink (UL) MU resources. The non-AP STA may either implicitly deliver BQRs in the BQR Control subfield of a frame transmitted to the AP (unsolicited BQR) or explicitly deliver BQRs in a frame sent to the AP in response to a BQRP Trigger frame (solicited BQR). The High Efficiency (HE) STA may report the channel availability information as specified in the technical standard (e.g. per 20 MHz CCA sensitivity) in the BQR Control subfield of frames it transmits if the AP has indicated its support in the BQR Support subfield of its HE Capabilities element; otherwise, the STA shall not report the channel availability information in the BQR Control subfield.

As wireless communications, such as Wi-Fi communications defined by the IEEE 802.11 technical standards, use wider channels and define 320 MHz communications in Extremely High Throughput applications, the current bandwidth signaling described above may be enhanced. For example, in the current bandwidth signaling described above, the receiver that receives an RTS frame will send the CTS frame if the NAV is zero and if the CCA is idle on the primary channel for a simple single channel RTS frame and different channels for the Bandwidth Indication operation. The CCA is idle on the primary channel if no Packet Detection (PD) above −82 dBm has been detected. The CCA is idle on secondary channels (e.g., 20/40/80 MHz) if no energy detection above −72/−69/−66 dBm respectively has been detected. The response will therefore be the same if energy was detected at −100 dBm, and if energy was detected at −73 dBm on the secondary. The response will therefore be the same if PD was detected at −100 dBm, and if energy was detected at −83 dBm on the primary. In all such situations, the STA that sends the CTS will tell the initiator that the channel is clear and that it can receive or transmit on the channel. While this is sufficient to allow access to the channel, it does not help the modulation and coding scheme (MCS) selection, and depending on the MCS that is used for the subsequent transmission, the probability of reception will be very different if the interfering energy is −100 dBm or if it is −73 dBm.

In another example, in the current bandwidth signaling described above, if the RTS is sent by an initiator on 40 MHz, the responder will check CCA on the primary 20 MHz and on the secondary 20 MHz. If the CCA on the secondary indicates busy, and CCA on the primary 20 MHz is idle, the responder will send the CTS on only the 20 MHz to indicate that only the primary 20 MHz can be used. However, if the energy detected on the secondary is very high (e.g., −20 dBm) or if it is very close to the limit (e.g., −71 dBm), the response will be the same by the responder, and it will allow a subsequent transmission on the primary channel. If the energy was detected very high on the secondary channel, there is a high probability that the adjacent channel interference (ACI) generated by this interferer will also impact the primary channel. In that case, for instance, the energy detected on the primary could be close to the limit of −62 dBm (without crossing it). There is a large difference between no interference at all on the primary channel, and interference as high as −63 dBm.

There is therefore a need to enhance bandwidth signaling that is fed back by the responder in an initiator-responder exchange, particularly to enable better link adaptation.

In one or more embodiments, responder feedback provided to an initiator may be enhanced so that the initiator may better adapt parameters of subsequent data transmission to the responder. For example, the initiator may use the responder feedback to adapt parameters such as bandwidth selection, MCS selection, the number of spatial streams (NSS) to use in transmission(s), resource units (RUs), and the like. In particular, the responder may report a detected and measured Noise Level per 20 MHz on one or multiple 20 MHz channels. The responder may measure the Noise Level right before the transmission of the frame carrying an indication of the Noise Level, during a short interframe space (SIFS) time before the transmission. The Noise Level may be reported for one or multiple RUs.

In one or more embodiments, the initiator device may send an RTS frame, or another type of frame, to a responder to indicate parameters for upcoming transmissions, such as the bandwidth, NSS, MCS, and/or RUs used in the upcoming transmissions. In response to the frame, the responder may include in a response frame (e.g., CTS or another type of frame), a signal-to-interference-plus-noise ratio (SINR) gap between the SINR that the responder may measure based on the transmission of the RTS or other request frame and the minimum SINR that should be obtained to allow for the parameters indicated by the RTS or other initiator frame.

In one or more embodiments, the initiator may send an RTS or another type of frame to a responder to request reported Noise Level measurements on one or more 20 MHz channels, and/or on one or more RUs. The report may include the SINR and/or the received signal strength indication (RSSI), and may indicate the energy detection level right before the transmission of the CTS or other response frame or right before the transmission of the RTS or other request frame. In response to the RTS or other request frame, the responder may include in the CTS or other response frame the Noise Level detected and measured on the 20 MHz channel(s) and/or on the RUs identified by the RTS or other request frame. The Noise Level may be measured right before transmission of the CTS or other response frame or may be measured right before reception of the RTS or other request frame by the responder. If the SINR and/or RSSI are used, the measurement may be based on the reception of the RTS or other request frame.

In one or more embodiments, the PD and/or energy detection (ED) used for CCA when using RTS/CTS or MU-RTS/CTS exchanges may be defined, along with a way for an initiator and responder to agree to operate an RTS/CTS and MU-RTS/CTS or a new frame exchange with a newly specified threshold, a way for the initiator to communicate to the responder which threshold to use for PD detection on the primary channel (e.g., an initiator-responder negotiation), and for ED detection on all channels (e.g., the thresholds will likely not be allowed to be set below the regulatory thresholds). Once the thresholds have been communicated to the responder, the responder may use the new thresholds when performing CCA for specific frame exchanges (e.g., the RTS/CTS, MU-RTS/CTS, a new frame exchange, etc.).

The proposed enhancements may be extended to MU uses by defining a way for an initiator to request feedback from multiple STAs at the same time, for example, by defining a new trigger frame to trigger the measurements and feedback from multiple STAs addressed by the trigger frame. Because of the enhancements, the initiator may be able to select/adjust parameters for subsequent data transmissions, such as MCS, NSS, RUs, bandwidth, and the like.

It is important to recognize the limited size and format of frames defined by the IEEE 802.11 technical standards. Frames defined by the IEEE 802.11 technical standards are specific frame types that, to add information without compromising the form and meaning of the frames, may require the definition of unused (e.g., reserved) bits. For example, adding a bit to a defined frame may render the defined frame a different type of frame, as the device that receives the frame may decode the frame and determine its contents based on the frame type. In this manner, adding information to existing types of defined frames may require using existing bits of the frames to communicate information that is not currently communicated in the defined frames. In particular, RTS and CTS frames have a limited number of bits.

In one or more embodiments, due to the limited size of RTS and CTS frames, the enhanced bandwidth signaling may be based on solutions for 6 GHz applications. To allow for solutions in the 2.4 GHz and 5 GHz bands, however, enhanced bandwidth signaling may build on existing RTS and CTS frames.

In the 6 GHz band, all devices support HE PPDUs—specific frame type defined by the IEEE 802.11 technical standards (e.g., devices that support the IEEE802.11ax technical standard and later versions). Because an HE PPDU includes a field in the PHY header called a transmission opportunity (TxOP) duration (e.g., indicating the time duration of a TxOP), it may be possible to replace the RTS/CTS exchange or MU-RTS/CTS exchange in a 6 GHz band with another type of exchange and response that use HE PPDUs (e.g., RTS frames and CTS frames are not HE PPDUs). The PHY header of the HE PPDUs used in the request and response both may include the TxOP duration information, and STAs that detect one or both of the HE PPDUs (e.g., a third device not included in the request-response exchange) may set their NAV accordingly, effectively performing the NAV setting function that the RTS-CTS exchange achieves.

In the IEEE 802.11ax technical standard, the HT Control field of the HE PPDU is used to carry small feedback information (e.g., in the A-Control subfields). One advantage is the inclusion of the feedback information in the HT Control field that is included in data, management, and quality of service (QoS) frames. However, the HT Control field includes only four bytes of data (e.g., adding bits to the HT Control field would result in a different type of field/frame), and the enhanced feedback information herein may require at least 26 bits.

In one or more embodiments, a new type of A-Control subfield may be defined to carry the enhanced feedback information. In one example, the SINR gap for requested parameters may be included in the request frame. In another example, for the Noise Level of a requested bandwidth or RU, if the desired accuracy is 5 dB accuracy between −100 and −82 dB for PD, the A-Control subfield would need three bits. In another example, for the Noise Level of a requested bandwidth or RU, if the desired accuracy is 5 dB accuracy between −100 and −62 dB for ED, the A-Control subfield would need four bits. If the desired accuracy is even greater, then more bits would be needed. If the desired feedback is always to be sent in response to a request, it is possible to append the Noise Level fields back-to-back (e.g., concatenation) without identifying to which 20 MHz channel or RU the field relates (and simply map it to the 20 MHz channels and RU that were requested in the request, in order). If the desired feedback is to be sent in an unsolicited manner, such would require fields to qualify the fields to identify to which 20 MHz channels or to which RU the Noise Level field relates. In this manner, any band that supports A-Control subfields may be used.

In one or more embodiments, a new Control Information subfield for A-Control type Noise Level Measurements (NLMs) may be defined as follows: Noise Level 1 subfield (e.g., four octets for the first channel or RU indicated in the request frame), Noise Level 2 subfield (e.g., four octets for the second channel or RU indicated in the request frame), Noise Level 3 subfield (e.g., four octets for the third channel or RU indicated in the request frame), and Noise Level 4 subfield (e.g., four octets for the fourth channel or RU indicated in the request frame)).

In one or more embodiments, a new Control Information subfield for a new A-Control type Noise Level Measurements (NLMs) may be defined as follows: Noise Level subfield (e.g., four octets for the first channel or RU indicated in the request frame), RU subfield (e.g., eight octets indicating the RU to which the Noise Level subfield applies, and Channel subfield (e.g., four octets indicating the channel to which the Noise Level subfield applies).

In one or more embodiments, to be less restricted in length and to provide more complete information, a new management frame or control frame (e.g., frames associated with devices joining or leaving a basic service set, such as authentication frames, association frames, beacons, and probes) may be defined to can carry more complete feedback information. For flexibility, a new Noise Level Measurements element may be added to a management or control frame with the following: Element ID (e.g., one octet), Length (e.g., one octet), Element ID Extension (e.g., one octet), and Noise Level Measurement (e.g., variable length). The Noise Level Measurement element may include a Noise Level subfield (e.g., four octets to indicate the Noise Level), a RU subfield (e.g., eight octets to indicate the RU to which the Noise Level applies), and/or a Channel subfield (e.g., eight octets to indicate the channel to which the Noise Level applies). The Noise Level Measurements element may include multiple Noise Level Measurement subfields—one for each measurement performed, and may be included in a new type of frame (e.g., a Noise Level Management response frame), or may be included in an existing frame (e.g., included in a Compressed Beamforming Feedback Report along with a Channel Quality Indicator).

In one or more embodiments, to request and collect the feedback from multiple devices, a new trigger frame may be defined. The trigger frame may use the existing User Information fields to address the devices being requested to perform the measurements, or may use the existing Trigger-Dependent Common Information field to request the same information from multiple users. The request may include a list of 20/40/80/160 MHz Channel numbers and/or a list of RUs, a total bandwidth (20/40/80/160/320 MHz), and/or a measurement unit (RU26, RU52, RU106, RU242, RU484, RU996, RU2x996, 20/40/80/160/320) to indicate that the request would be to provide feedback for all the measurement units in the total bandwidth (e.g., for total BW: 20 MHz and Measurement unit: RU 26 tones, the request would be to provide data in response to measurement for all 26 tones RUs within the 20 MHz channel).

In one or more embodiments, to enable the use of an RTS-CTS exchange for the enhanced signaling, a container may be defined to provide additional information that EHT STAs may read, while also allowing legacy STAs to receive the RTS and CTS frames as if there were no changes to the RTS and CTS frames. Options may include bits in the Frame Control in the medium access control (MAC) header of the RTS and CTS frame that could be used to include additional signaling. These bits may be reused, but they are limited to only six, and therefore may only include the signaling for a single 20 MHz channel. Another option considers that EHT STAs may process the RTS and the CTS frame faster than legacy STAs, and it may be possible to include one or maybe three additional orthogonal frequency-division multiplexing (OFDM) symbols at the end of the RTS or the CTS frame. This can be like an additional post-SIG field of one or two OFDM symbols that may be included at the end of the frame. Such an additional field may be not included in the length calculation so that legacy STAs see the end of the packet at the end of the RTS or CTS frame and before the additional SIG field. EHT STAs would, however, detect when there is energy one OFDM symbol after or through a signaling indication the presence of this post-SIG field, and would detect this post-SIG field. The transmission of this post-SIG field may be performed during the first 4 or 8 ms of the 16 ms period that immediately follows the end-of-packet (as indicated by the length of the RTS or CTS frame). The post-SIG field would need to include a cyclic redundancy check (CRC) and a tail bit of 2/4 and 6 bits, which would leave 14 to 16 bits signaling for 1-OFDM symbols post-SIG; and a CRC and tail bit of 8 and 6 bits, which would leave 34 bits signaling for 2-OFDM symbol post-SIG. The enhancement would allow for including the signaling needed for some use cases.

The enhancements disclosed herein differ from other existing request-response exchanges that involve channel measurements. For example, channel sounding is an existing process that involves channel measurement requests. In the present disclosure, however, the enhancements provide a way for an initiator device to request information that the initiator device may use to select bandwidth and/or RUs to use for wireless communications.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1A is a network diagram illustrating an example network environment, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 3:
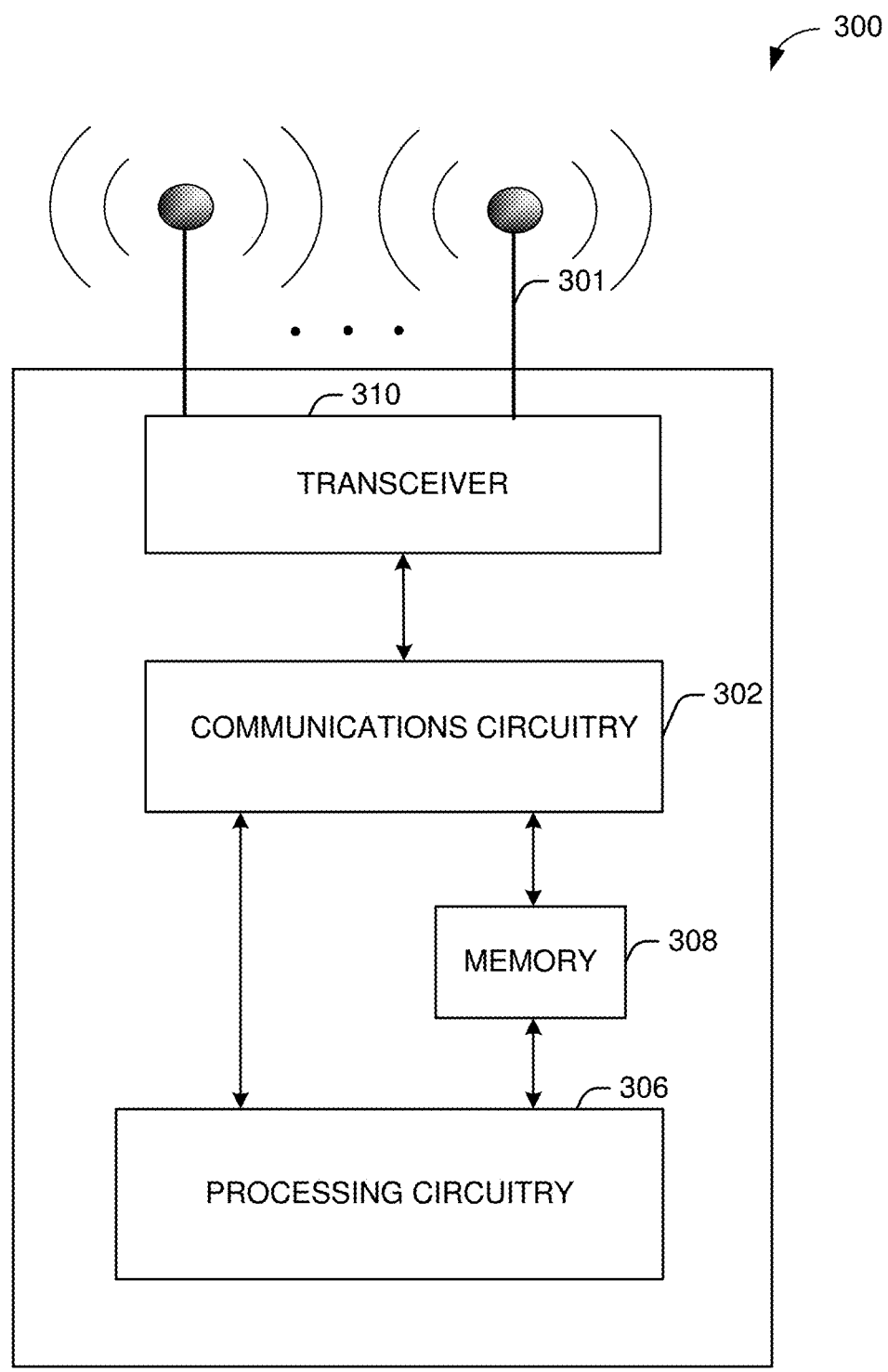
FIG. 3 illustrates a functional diagram of an exemplary communication station that may be suitable for use as a user device, in accordance with one or more example embodiments of the present disclosure.
Figure 4:
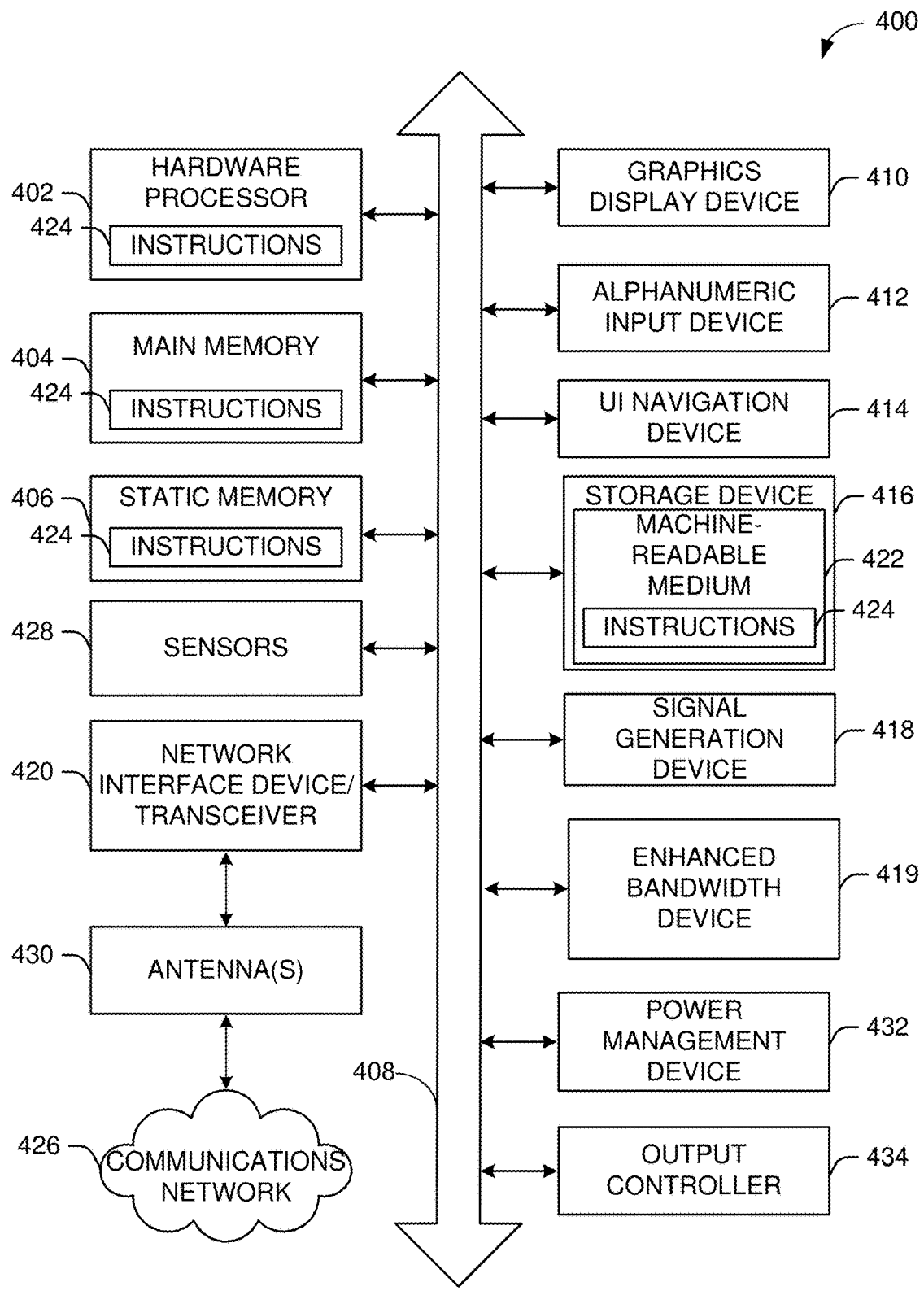
FIG. 4 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 3 and/or the example machine/system of FIG. 4.

One or more illustrative user device(s) 120 and/or AP(s) 102 may be operable by one or more user(s) 110. It should be noted that any addressable unit may be a station (STA). An STA may take on multiple distinct characteristics, each of which shapes its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1A, AP 102 may communicate with one or more user devices 120. The AP 102 may send request frames 140 (e.g., RTS frames, HE PPDUs, trigger frames, management or control frames, QoS frames, etc. as defined by the IEEE 802.11 technical standards) to the one or more user devices 120 to request the one or more user devices 120 to provide channel measurements based on a bandwidth and/or RUs indicated by the request frames 140 (e.g., using a bandwidth field 141 and/or an RU field 142). The one or more user devices 120 may perform measurements as requested by the request frames 140, and may provide the measurements in response frames 143 to the AP 102 (e.g., using a measurement field 144 to indicate the measured noise of a bandwidth indicated by a bandwidth field 145 and/of an RU field 146).

It is understood that the above descriptions are for purposes of illustration and are not meant to be limiting.

Figure 1B:
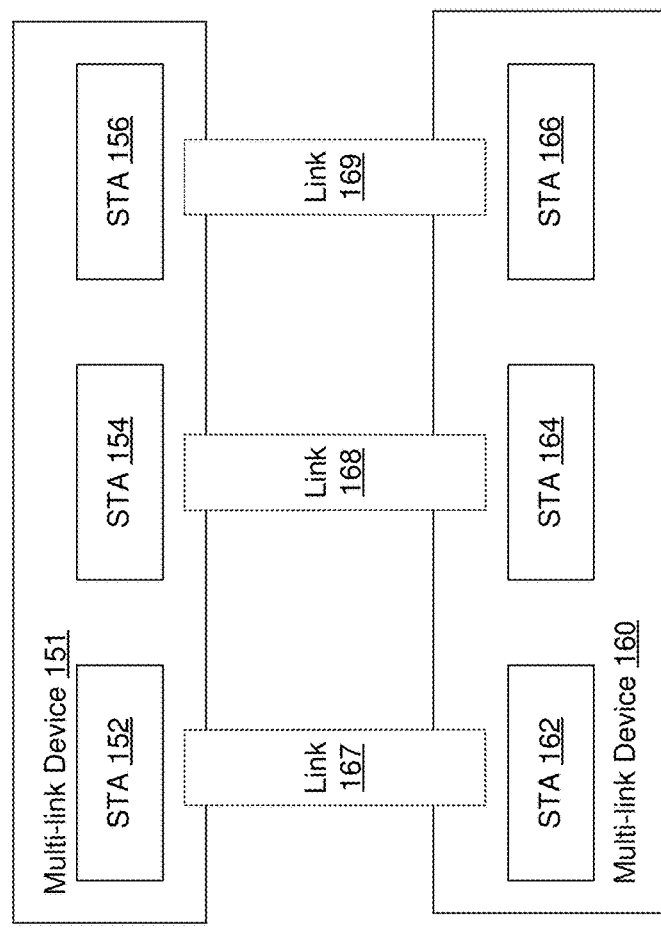
FIG. 1B depicts an illustrative schematic diagram for multi-link device (MLD) communications between two logical entities, in accordance with one or more example embodiments of the present disclosure.

FIG. 1B depicts an illustrative schematic diagram 150 for MLD communications between two logical entities, in accordance with one or more example embodiments of the present disclosure.

Referring to FIG. 1B, there are shown two MLDs in communication with each other. MLD 151 may include multiple STAs (e.g., STA 152, STA 154, STA 156, etc.), and MLD 160 may include multiple STAs (e.g., STA 162, STA 164, STA 166, etc.). The STAs of the MLD 151 and the STAs of the MLD 160 may set up links with each other (e.g., link 167 for a first frequency band used by the STA 152 and the STA 162, link 168 for a second frequency band used by the STA 154 and the STA 164, link 169 for a second frequency band used by the STA 156 and the STA 166). In this example of FIG. 1B, the two MLDs may be two separate physical devices, where each one comprises a number of virtual or logical devices (e.g., the STAs).

Figure 1C:
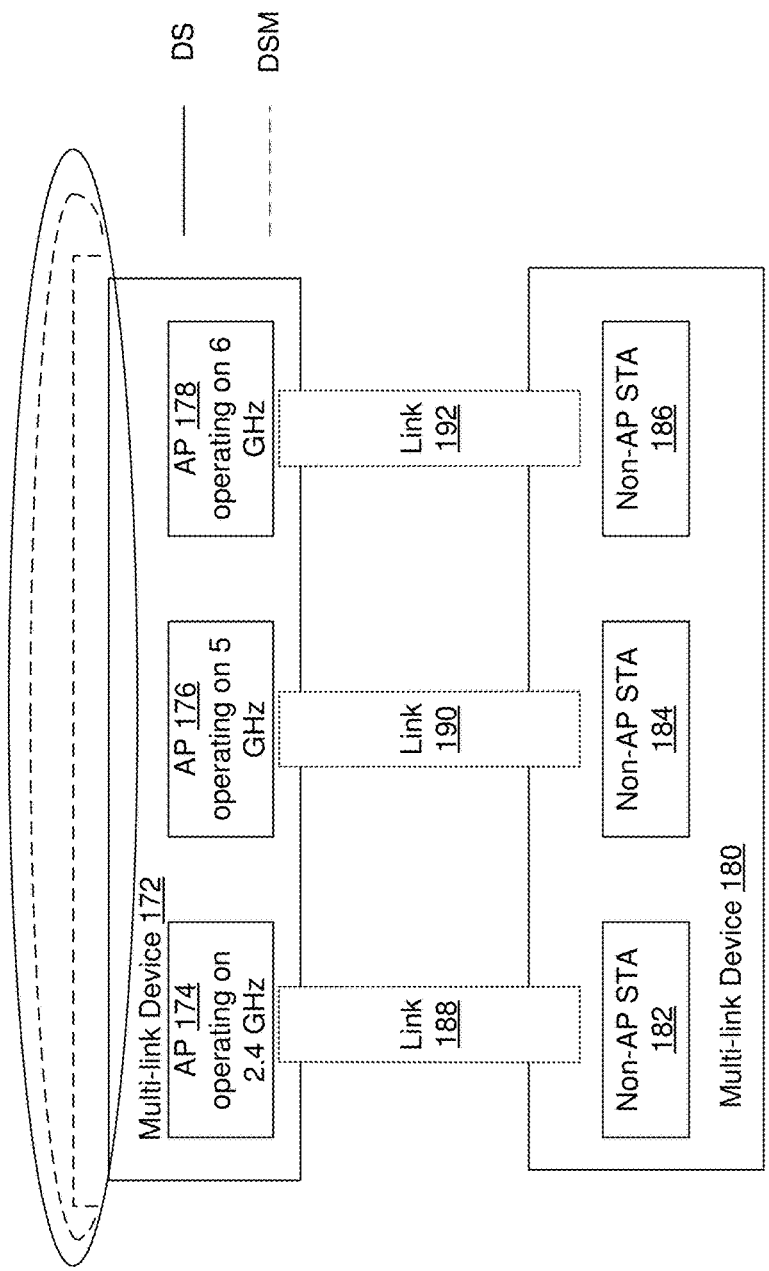
FIG. 1C depicts an illustrative schematic diagram for MLD communications between an access point (AP) MLD with logical entities and a non-AP MLD with logical entities, in accordance with one or more example embodiments of the present disclosure.

FIG. 1C depicts an illustrative schematic diagram 170 for MLD communications between an AP MLD with logical entities and a non-AP MLD with logical entities, in accordance with one or more example embodiments of the present disclosure.

Referring to FIG. 1C, there are shown two MLDs on either side, each which includes multiple STAs that can set up links with each other. For infrastructure framework, MLD 172 may be an A-MLD with logical APs (e.g., AP 174, AP 176, and AP 178) on one side, and MLD 180 may be a non-AP MLD including non-AP logical entities (non-AP STA 182, non-AP STA 184, and non-AP STA 186) on the other side. The detailed definition is shown below. It should be noted that the term MLLE and MLD are interchangeable and indicate the same type of entity. Throughout this disclosure, MLLE may be used but anywhere the MLLE term is used, it can be replaced with MLD. Multi-link non-AP logical entity (non-AP MLLE, also can be referred to as non-AP MLD): A multi-link logical entity, where each STA within the multi-link logical entity is a non-AP EHT STA. It should be noted that this framework is a natural extension from the one link operation between two STAs, which are AP and non-AP STA under the infrastructure framework (e.g., when an AP is used as a medium for communication between STAs).

In the example of FIG. 1C, the MLD 172 and the MLD 180 may be two separate physical devices, where each one comprises a number of virtual or logical devices. For example, the multi-link AP logical entity may comprise three APs, AP 174 operating on 2.4 GHz (e.g., link 188), AP 176 operating on 5 GHz (e.g., link 190), and AP 178 operating on 6 GHz (e.g., link 192). Further, the multi-link non-AP logical entity may comprise three non-AP STAs, non-AP STA 182 communicating with AP 174 on link 188, non-AP STA 184 communicating with AP 176 on link 190, and non-AP STA 186 communicating with AP 178 on link 192.

The MLD 172 is shown in FIG. 1C to have access to a distribution system (DS), which is a system used to interconnect a set of BSSs to create an extended service set (ESS). The MLD 172 is also shown in FIG. 1C to have access a distribution system medium (DSM), which is the medium used by a DS for BSS interconnections. Simply put, DS and DSM allow the AP to communicate with different BSSs.

It should be understood that although the example shows three logical entities within the MLD 172 and the three logical entities within the MLD 180, this is merely for illustration purposes and that other numbers of logical entities with each of the MLDs may be envisioned.

It is understood that the above descriptions are for purposes of illustration and are not meant to be limiting.

Figure 2A:
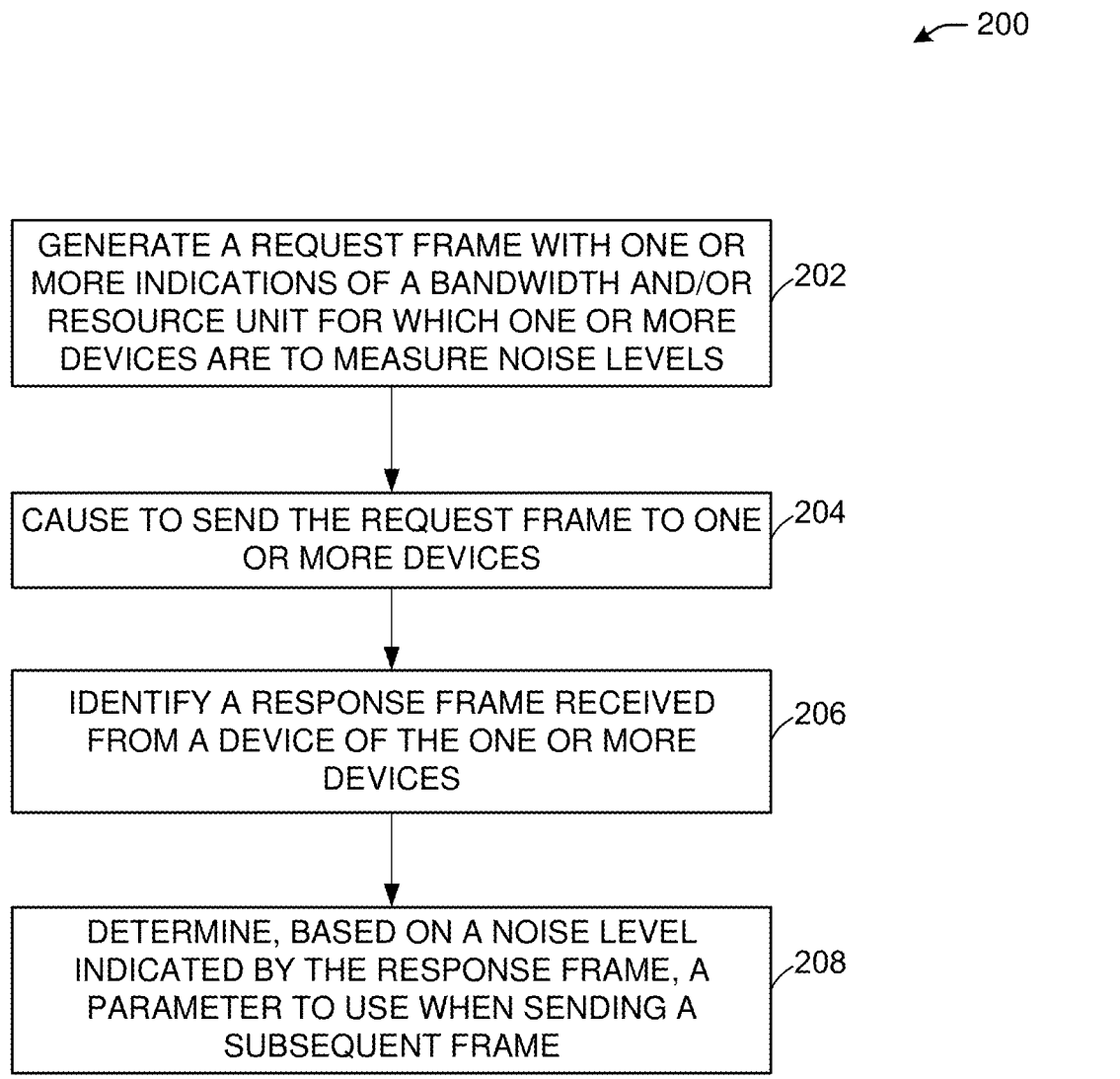
FIG. 2A illustrates a flow diagram of illustrative process for enhanced bandwidth signaling, in accordance with one or more example embodiments of the present disclosure.

FIG. 2A illustrates a flow diagram of illustrative process 200 for enhanced bandwidth signaling, in accordance with one or more example embodiments of the present disclosure.

At block 202, a device (e.g., the AP 102 of FIG. 1A) may generate a request frame (e.g., the one or more request frames 140 of FIG. 1A) including one or more indications of one or more bandwidths and/or resource units for which one or more devices are to measure noise levels. The request frame may be an RTS frame, an HE PPDU, a management or control frame, a QoS frame, a trigger frame, or another type of IEEE 802.11 frame.

At block 204, the device may send the request frame to one or more devices. For example, when the request frame is a single user RTS frame, the device may send the RTS frame to a single user to request the user to perform the measurement(s) and provide a response with the measurement data (e.g., when the device's NAV is set to zero and the CCA is idle). When the device is a MU-RTS frame, the MU-RTS frame may be sent to multiple devices requested to perform and report the measurements, resulting in separate responses from the responder devices when the conditions allow the response. When the request is a trigger frame, one or more responder devices may be identified, indicating to the responder devices to perform measurements based on the bandwidth and/or RU identified in the request.

At block 206, the device may identify a respective response frame (e.g., the one or more response frames 143 of FIG. 1A) received from responder devices that were identified in the request frame. The response frame(s) may include Noise Level Measurements for bandwidth and/or RUs requested in the request frame. The response frame may include a Control Information subfield of an A-Control type Noise Level Measurements field as shown below in Table 1. The response frame may include a Control Information subfield of an A-Control type Noise Level Measurements field as shown below in Table 2. The response frame may include a Noise Level Measurement element as shown below in Table 3, and the Noise Level Measurement element may include a Noise Level Measurement subfield as shown below in Table 4.

TABLE 1

| | Control Information subfield of an A-Control type Noise Level Measurements field: | | | |
|---|---|---|---|---|
| Subfield | Noise Level 1 | Noise Level 2 | Noise Level 3 | Noise Level 4 |
| Octets | 4 | 4 | 4 | 4 |

In Table 1, Noise Level 1 would correspond to the first 20 or 40 or 80 or 160 MHz channel or RU that was requested in the request frame. Noise Level 2 would correspond to the second 20 or 40 or 80 or 160 MHz channel or RU that was requested in the request frame, and so on.

TABLE 2

| | Control Information subfield of an A-Control type Noise Level Measurements field: | | |
|---|---|---|---|
| Subfield | Noise Level | Resource Unit (RU) | Channel |
| Octets | 4 | 8 | 4 |

In Table 2, the RU field and Channel fields are used to determine on what channel or on what RU the Noise Level Measurement applies.

TABLE 3

| | Noise Level Measurement Element: | | | |
|---|---|---|---|---|
| Subfield | Element ID | Length | Element ID Extension | Noise Level Measurement |
| Octets | 1 | 1 | 1 | Variable |

TABLE 4

| | Noise Level Measurement Subfield: | | |
|---|---|---|---|
| Subfield | Noise Level | RU | Channel |
| Octets | 4 | 8 | 4 |

The Noise Level Measurements element may include multiple Noise Level Measurement subfields, one for each measurement performed. This element can be included in a new frame (Noise Level Measurement response frame), or can be included in any existing frame, for instance this could be provided along with a CQI report or Compressed Beamforming feedback report.

At block 208, the device may determine, based on any received Noise Level Measurements, one or more parameters to use when sending one or more subsequent frames. The device may select a bandwidth, RUs, number of spatial streams, MCS, and/or other parameters based on the Noise Level Measurements. For example, when the Noise Level Measurements indicate that a frequency band and/or RU is too noisy (e.g., exceeds a noise level threshold that may be different than the current thresholds of −82 dBm for a primary channel, −72 dBm for a secondary 20 MHz channel, −69 dBm for a secondary 40 MHz channel, and −66 dBm for a secondary 80 MHz channel), the device may select a channel whose noise level, or whose neighboring channel's noise level, is not above a noise threshold. The device may adjust the MCS to account for a noise level exceeding a noise threshold, and the like.

Figure 2B:
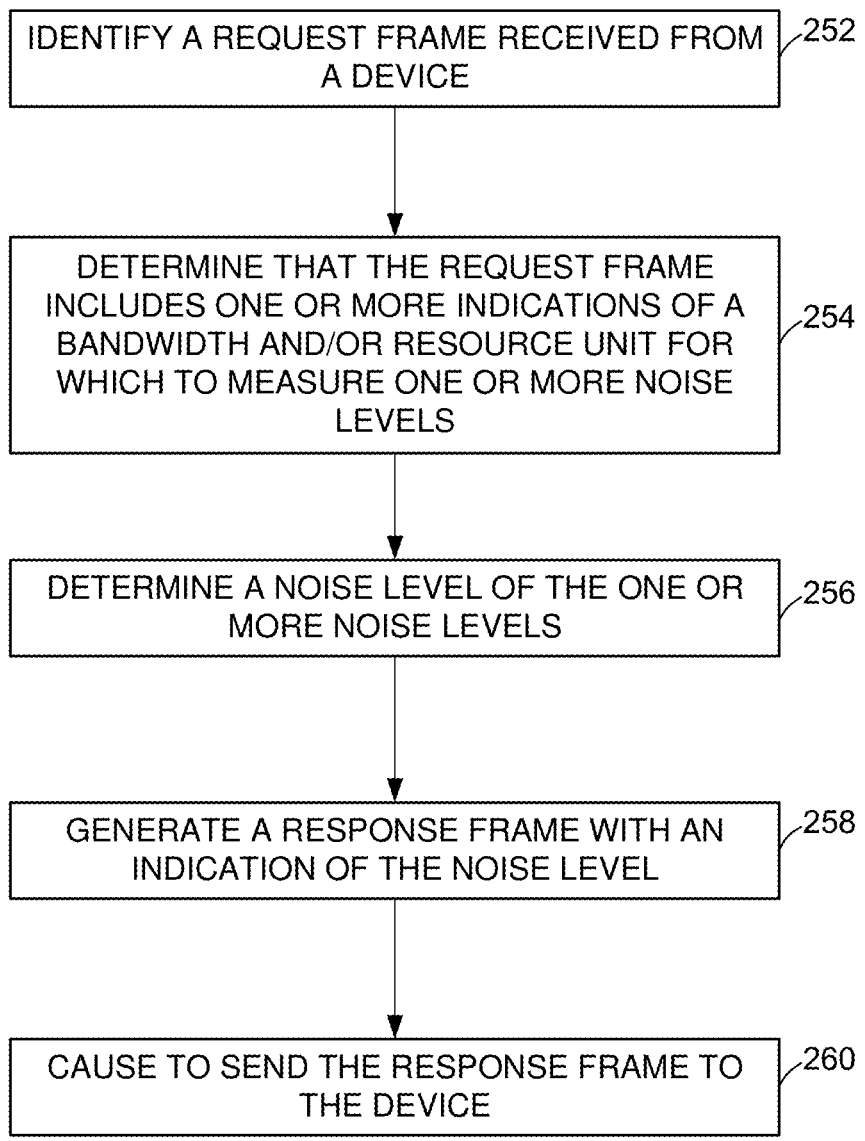
FIG. 2B illustrates a flow diagram of illustrative process for enhanced bandwidth signaling, in accordance with one or more example embodiments of the present disclosure.

FIG. 2B illustrates a flow diagram of illustrative process 250 for enhanced bandwidth signaling, in accordance with one or more example embodiments of the present disclosure.

At block 252, a device (e.g., the one or more user devices 120 of FIG. 1A) may identify a request frame (e.g., the one or more request frames 140 of FIG. 1A) received from an AP device (e.g., the AP 102 of FIG. 1A). The device may be associated with the AP device (e.g., in a basic service set facilitated by the AP device). The request frame may be an RTS frame, an HE PPDU, a management or control frame, a QoS frame, a trigger frame, or another type of IEEE 802.11 frame. For example, when the request frame is a single user RTS frame, the device may send the RTS frame to a single user to request the user to perform the measurement(s) and provide a response with the measurement data (e.g., when the device's NAV is set to zero and the CCA is idle). When the device is a MU-RTS frame, the MU-RTS frame may be sent to multiple devices requested to perform and report the measurements, resulting in separate responses from the responder devices when the conditions allow the response. When the request is a trigger frame, one or more responder devices may be identified, indicating to the responder devices to perform measurements based on the bandwidth and/or RU identified in the request.

At block 254, the device may determine that the request frame includes one or more indications of one or more bandwidths and/or resource units for which one or more devices (e.g., including the device) are to measure noise levels. The request frame may identify the device and any other devices requested by the AP device to perform and provide Noise Level Measurements for a bandwidth and/or RU, and may identify the bandwidth and/or RU to be measured.

At block 256, the device may perform the requested Noise Level Measurement(s) (e.g., when the device's NAV is set to zero and the CCA is idle). The performance of Noise Level Measurements is defined by the IEEE 802.11 technical standards.

At block 258, the device may generate a response frame (e.g., the one or more response frames 143 of FIG. 1A) received from responder devices that were identified in the request frame. The response frame(s) may include Noise Level Measurements for bandwidth and/or RUs requested in the request frame. The response frame may include a Control Information subfield of an A-Control type Noise Level Measurements field as shown above in Table 1. The response frame may include a Control Information subfield of an A-Control type Noise Level Measurements field as shown above in Table 2. The response frame may include a Noise Level Measurement element as shown above in Table 3, and the Noise Level Measurement element may include a Noise Level Measurement subfield as shown above in Table 4.

At block 260, the device may cause to send the response frame to the AP device, allowing the AP device to select bandwidth, RUs, MCS, number of spatial streams, and/or other parameters to use in subsequent transmissions. For example, when the Noise Level Measurements indicate that a frequency band and/or RU is too noisy (e.g., exceeds a noise level threshold that may be different than the current thresholds of −82 dBm for a primary channel, −72 dBm for a secondary 20 MHz channel, −69 dBm for a secondary 40 MHz channel, and −66 dBm for a secondary 80 MHz channel), the AP device may select a channel whose noise level, or whose neighboring channel's noise level, is not above a noise threshold. The device may receive one or more subsequent transmissions from the AP device using the selected parameters based on the Noise Level Measurement(s).

It is understood that the above descriptions are for purposes of illustration and are not meant to be limiting.

FIG. 3 shows a functional diagram of an exemplary communication station 300 in accordance with some embodiments. In one embodiment, FIG. 3 illustrates a functional block diagram of a communication station that may be suitable for use as an AP 102 (FIG. 1A) or user device 120 (FIG. 1A) in accordance with some embodiments. The communication station 300 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 300 may include communications circuitry 302 and a transceiver 310 for transmitting and receiving signals to and from other communication stations using one or more antennas 301. The communications circuitry 302 may include circuitry that can operate the physical layer (PHY) communications and/or medium access control (MAC) communications for controlling access to the wireless medium, and/or any other communications layers for transmitting and receiving signals. The communication station 300 may also include processing circuitry 306 and memory 308 arranged to perform the operations described herein. In some embodiments, the communications circuitry 302 and the processing circuitry 306 may be configured to perform operations detailed in FIGS. 1-2B.

In accordance with some embodiments, the communications circuitry 302 may be arranged to contend for a wireless medium and configure frames or packets for communicating over the wireless medium. The communications circuitry 302 may be arranged to transmit and receive signals. The communications circuitry 302 may also include circuitry for modulation/demodulation, upconversion/downconversion, filtering, amplification, etc. In some embodiments, the processing circuitry 306 of the communication station 300 may include one or more processors. In other embodiments, two or more antennas 301 may be coupled to the communications circuitry 302 arranged for sending and receiving signals. The memory 308 may store information for configuring the processing circuitry 306 to perform operations for configuring and transmitting message frames and performing the various operations described herein. The memory 308 may include any type of memory, including non-transitory memory, for storing information in a form readable by a machine (e.g., a computer). For example, the memory 308 may include a computer-readable storage device, read-only memory (ROM), random-access memory (RAM), magnetic disk storage media, optical storage media, flash-memory devices and other storage devices and media.

In some embodiments, the communication station 300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 300 may include one or more antennas 301. The antennas 301 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 300 may include one or more of a keyboard, a display, a non-volatile memory port, multiple antennas, a graphics processor, an application processor, speakers, and other mobile device elements. The display may be an LCD screen including a touch screen.

Although the communication station 300 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 300 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 300 may include one or more processors and may be configured with instructions stored on a computer-readable storage device memory.

FIG. 4 illustrates a block diagram of an example of a machine 400 or system upon which any one or more of the techniques (e.g., methodologies) discussed herein may be performed. In other embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environments. The machine 400 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a power management device 432, a graphics display device 410, an alphanumeric input device 412 (e.g., a keyboard), and a user interface (UI) navigation device 414 (e.g., a mouse). In an example, the graphics display device 410, alphanumeric input device 412, and UI navigation device 414 may be a touch screen display. The machine 400 may additionally include a storage device (i.e., drive unit) 416, a signal generation device 418 (e.g., a speaker), an enhanced bandwidth device 419, a network interface device/transceiver 420 coupled to antenna(s) 430, and one or more sensors 428, such as a global positioning system (GPS) sensor, a compass, an accelerometer, or other sensor. The machine 400 may include an output controller 434, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 402 for generation and processing of the baseband signals and for controlling operations of the main memory 404, the storage device 416, and/or the enhanced bandwidth device 419. The baseband processor may be provided on a single radio card, a single chip, or an integrated circuit (IC).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within the static memory 406, or within the hardware processor 402 during execution thereof by the machine 400. In an example, one or any combination of the hardware processor 402, the main memory 404, the static memory 406, or the storage device 416 may constitute machine-readable media.

The enhanced bandwidth device 419 may carry out or perform any of the operations and processes (e.g., process 200 of FIG. 2A, process 250 of FIG. 2B) described and shown above.

It is understood that the above are only a subset of what the enhanced bandwidth device 419 may be configured to perform and that other functions included throughout this disclosure may also be performed by the enhanced bandwidth device 419.

While the machine-readable medium 422 is illustrated as a single medium, the term "machine-readable medium" may include a single medium or multiple media (e.g., a centralized or distributed database, and/or associated caches and servers) configured to store the one or more instructions 424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 400 and that cause the machine 400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device/transceiver 420 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 420 may include one or more physical jacks (e.g., Ethernet, coaxial, or phone jacks) or one or more antennas to connect to the communications network 426. In an example, the network interface device/transceiver 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may be a device comprising memory and processing circuitry configured to: generate a request frame comprising at least one of a first indication of a bandwidth for which a second device is to measure a first noise level or a second indication of a resource unit for which the second device is to measure a second noise level; cause to send the request frame to the second device; identify a response frame received from the second device, the response frame comprising a third indication of the first noise level or the second noise level and a fourth indication of the bandwidth or the resource unit; and determine, based on the first noise level or the second noise level, a parameter associated with a subsequent frame to send to the second device.

Example 2 may include the device of example 1 and/or some other example herein, wherein the request frame is a Request-to-Send (RTS) frame.

Example 3 may include the device of example 2 and/or some other example herein, wherein a Frame Control field of a medium access control (MAC) layer header of the RTS frame comprises the fourth indication, and wherein the fourth indication is associated with a single 20 MHz channel.

Example 4 may include the device of example 2 and/or some other example herein, wherein the RTS frame comprises one or more orthogonal frequency-division multiplexing (OFDM) symbols after a Signature field of the RTS frame, the one or more OFDM symbols comprising a cyclic redundancy check (CRC) and a tail bit, wherein the one or more OFDM symbols are readable by Extremely High Throughput (EHT) devices and are not readable by non-EHT devices.

Example 5 may include the device of example 1 and/or some other example herein, wherein the request frame is a multi-user (MU) RTS frame further comprising a fifth indication of the second device and a sixth indication of a third device to measure a third noise level.

Example 6 may include the device of example 1 and/or some other example herein, wherein the request frame is a trigger frame.

Example 7 may include the device of example 1 and/or some other example herein, wherein the request frame is a management frame or a control frame.

Example 8 may include the device of example 1 and/or some other example herein, wherein the response frame is a Clear-to-Send (CTS) frame.

Example 9 may include the device of example 1 and/or some other example herein, wherein the response frame is a High Efficiency (HE) physical layer protocol data unit (PPDU) comprising an A-Control subfield, and wherein the third indication and the fourth indication are included in the A-Control subfield.

Example 10 may include the device of example 1 and/or some other example herein, wherein the parameter comprises at least one of the bandwidth, a modulation and coding scheme (MCS), a number of spatial streams, or the resource unit.

Example 11 may include the device of example 1 and/or some other example herein, wherein the bandwidth is a first bandwidth that consists of 20 MHz, wherein the request frame further comprises a fifth indication of a second bandwidth that consists of another 20 MHz.

Example 12 may include the device of example 1 and/or some other example herein, wherein the first noise level or the second noise level is measured during an interframe space time preceding transmission of the response frame.

Example 13 may include the device of example 1 and/or some other example herein, wherein the request frame is a MU-RTS frame, and wherein the response frame is an HE PPDU.

Example 14 may include the device of example 1 and/or some other example herein, wherein the bandwidth is associated with a primary communication channel, and wherein the response frame indicates that the first noise level or the second noise level satisfies a noise threshold greater than −82 dbM.

Example 15 may include the device of example 1 and/or some other example herein, further comprising a transceiver configured to transmit and receive wireless signals.

Example 16 may include the device of example 15 and/or some other example herein, further comprising one or more antennas coupled to the transceiver.

Example 17 may include a non-transitory computer-readable medium storing computer-executable instructions which when executed by one or more processors result in performing operations comprising: identifying, by a first device, a request frame received from a second device; determining that the request frame comprises at least one of a first indication of a bandwidth for which the first device is to measure a first noise level or a second indication of a resource unit for which the first device is to measure a second noise level; determining at least one of the first noise level or the second noise level during an interframe space time preceding transmission of a response frame; generating the response frame, the response frame comprising a third indication of the first noise level or the second noise level and a fourth indication of the bandwidth or the resource unit; and causing to send the response frame to the second device.

Example 18 may include the non-transitory computer-readable medium of example 17 and/or some other example herein, wherein the request frame is a Request-to-Send (RTS) frame, and wherein the response frame is a Clear-to-Send (CTS) frame, a High Efficiency (HE) physical layer protocol data unit (PPDU), a management frame, or a control frame.

Example 19 may include a method comprising: generating, by processing circuitry of a first device, a request frame comprising at least one of a first indication of a bandwidth for which a second device is to measure a first noise level or a second indication of a resource unit for which the second device is to measure a second noise level; causing to send, by the processing circuitry, the request frame to the second device; identifying, by the processing circuitry, a response frame received from the second device, the response frame comprising a third indication of the first noise level or the second noise level and a fourth indication of the bandwidth or the resource unit; and determining, by the processing circuitry, based on the first noise level or the second noise level, a parameter associated with a subsequent frame to send to the second device.

Example, 20 may include the method of example 19 and/or some other example herein, wherein the request frame is a Request-to-Send (RTS) frame, and wherein the response frame is a Clear-to-Send (CTS) frame, a High Efficiency (HE) physical layer protocol data unit (PPDU), a management frame, or a control frame.

Example 21 may include an apparatus comprising means for: generating, by a first apparatus, a request frame comprising at least one of a first indication of a bandwidth for which a second apparatus is to measure a first noise level or a second indication of a resource unit for which the second apparatus is to measure a second noise level; causing to send the request frame to the second apparatus; identifying a response frame received from the second apparatus, the response frame comprising a third indication of the first noise level or the second noise level and a fourth indication of the bandwidth or the resource unit; and determining, based on the first noise level or the second noise level, a parameter associated with a subsequent frame to send to the second apparatus.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

Figure 5:
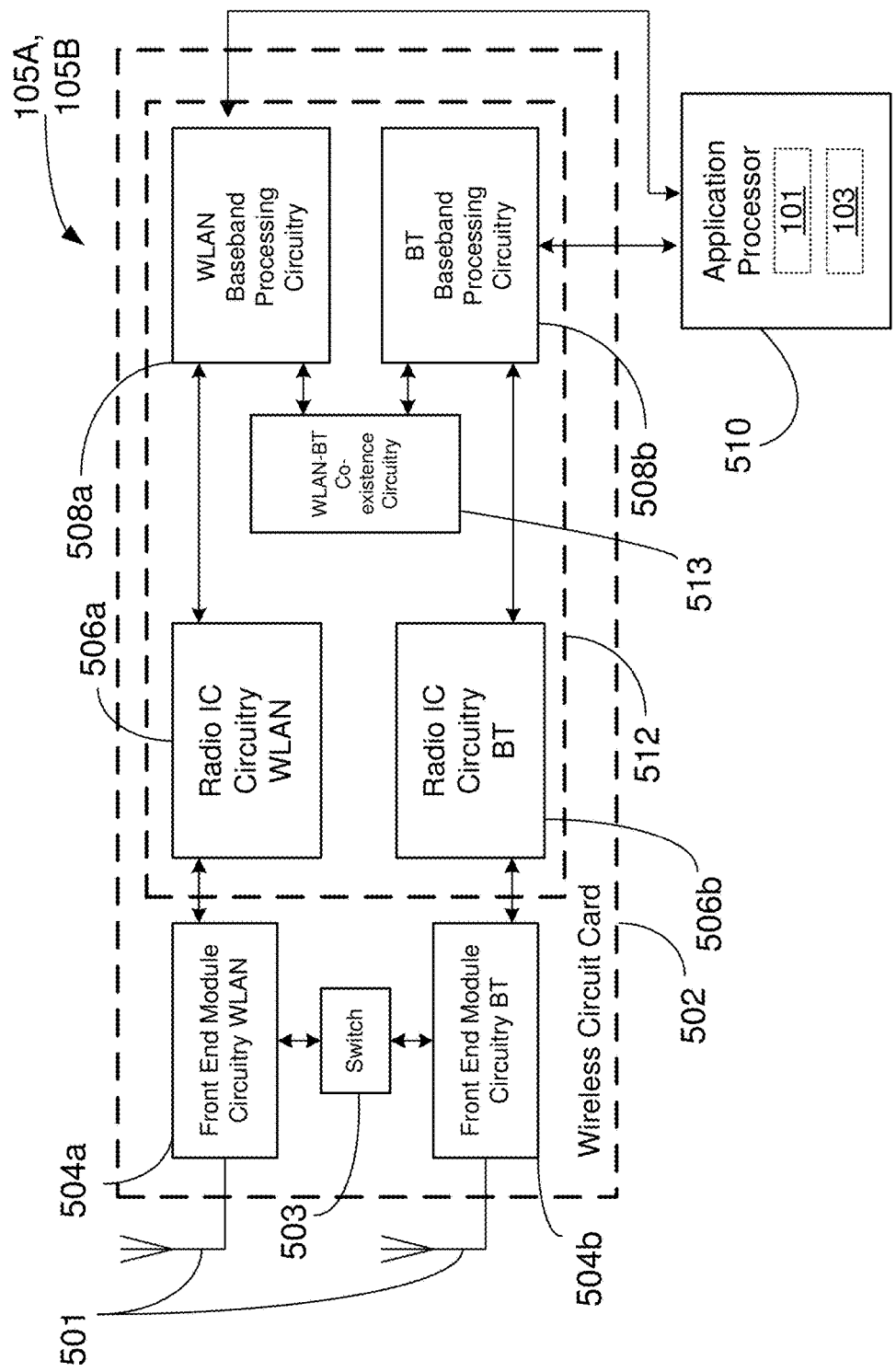
FIG. 5 is a block diagram of a radio architecture in accordance with some examples.

FIG. 5 is a block diagram of a radio architecture 105A, 105B in accordance with some embodiments that may be implemented in any one of the example AP 102 and/or the example user device(s) 120 of FIG. 1A. Radio architecture 105A, 105B may include radio front-end module (FEM) circuitry 504a-b, radio IC circuitry 506a-b and baseband processing circuitry 508a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 504a-b may include a WLAN or Wi-Fi FEM circuitry 504a and a Bluetooth (BT) FEM circuitry 504b. The WLAN FEM circuitry 504a may include a receive signal path comprising circuitry configured to operate on WLAN RF signals received from one or more antennas 501, to amplify the received signals and to provide the amplified versions of the received signals to the WLAN radio IC circuitry 506a for further processing. The BT FEM circuitry 504b may include a receive signal path which may include circuitry configured to operate on BT RF signals received from one or more antennas 501, to amplify the received signals and to provide the amplified versions of the received signals to the BT radio IC circuitry 506b for further processing. FEM circuitry 504a may also include a transmit signal path which may include circuitry configured to amplify WLAN signals provided by the radio IC circuitry 506a for wireless transmission by one or more of the antennas 501. In addition, FEM circuitry 504b may also include a transmit signal path which may include circuitry configured to amplify BT signals provided by the radio IC circuitry 506b for wireless transmission by the one or more antennas. In the embodiment of FIG. 5, although FEM 504a and FEM 504b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 506a-b as shown may include WLAN radio IC circuitry 506a and BT radio IC circuitry 506b. The WLAN radio IC circuitry 506a may include a receive signal path which may include circuitry to down-convert WLAN RF signals received from the FEM circuitry 504a and provide baseband signals to WLAN baseband processing circuitry 508a. BT radio IC circuitry 506b may in turn include a receive signal path which may include circuitry to down-convert BT RF signals received from the FEM circuitry 504b and provide baseband signals to BT baseband processing circuitry 508b. WLAN radio IC circuitry 506a may also include a transmit signal path which may include circuitry to up-convert WLAN baseband signals provided by the WLAN baseband processing circuitry 508a and provide WLAN RF output signals to the FEM circuitry 504a for subsequent wireless transmission by the one or more antennas 501. BT radio IC circuitry 506b may also include a transmit signal path which may include circuitry to up-convert BT baseband signals provided by the BT baseband processing circuitry 508b and provide BT RF output signals to the FEM circuitry 504b for subsequent wireless transmission by the one or more antennas 501. In the embodiment of FIG. 5, although radio IC circuitries 506a and 506b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 508a-b may include a WLAN baseband processing circuitry 508a and a BT baseband processing circuitry 508b. The WLAN baseband processing circuitry 508a may include a memory, such as, for example, a set of RAM arrays in a Fast Fourier Transform or Inverse Fast Fourier Transform block (not shown) of the WLAN baseband processing circuitry 508a. Each of the WLAN baseband circuitry 508a and the BT baseband circuitry 508b may further include one or more processors and control logic to process the signals received from the corresponding WLAN or BT receive signal path of the radio IC circuitry 506a-b, and to also generate corresponding WLAN or BT baseband signals for the transmit signal path of the radio IC circuitry 506a-b. Each of the baseband processing circuitries 508a and 508b may further include physical layer (PHY) and medium access control layer (MAC) circuitry, and may further interface with a device for generation and processing of the baseband signals and for controlling operations of the radio IC circuitry 506a-b.

Referring still to FIG. 5, according to the shown embodiment, WLAN-BT coexistence circuitry 513 may include logic providing an interface between the WLAN baseband circuitry 508a and the BT baseband circuitry 508b to enable use cases requiring WLAN and BT coexistence. In addition, a switch 503 may be provided between the WLAN FEM circuitry 504a and the BT FEM circuitry 504b to allow switching between the WLAN and BT radios according to application needs. In addition, although the antennas 501 are depicted as being respectively connected to the WLAN FEM circuitry 504a and the BT FEM circuitry 504b, embodiments include within their scope the sharing of one or more antennas as between the WLAN and BT FEMs, or the provision of more than one antenna connected to each of FEM 504a or 504b.

In some embodiments, the front-end module circuitry 504a-b, the radio IC circuitry 506a-b, and baseband processing circuitry 508a-b may be provided on a single radio card, such as wireless radio card 502. In some other embodiments, the one or more antennas 501, the FEM circuitry 504a-b and the radio IC circuitry 506a-b may be provided on a single radio card. In some other embodiments, the radio IC circuitry 506a-b and the baseband processing circuitry 508a-b may be provided on a single chip or integrated circuit (IC), such as IC 512.

In some embodiments, the wireless radio card 502 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11 ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the BT baseband circuitry 508b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., SGPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 6:
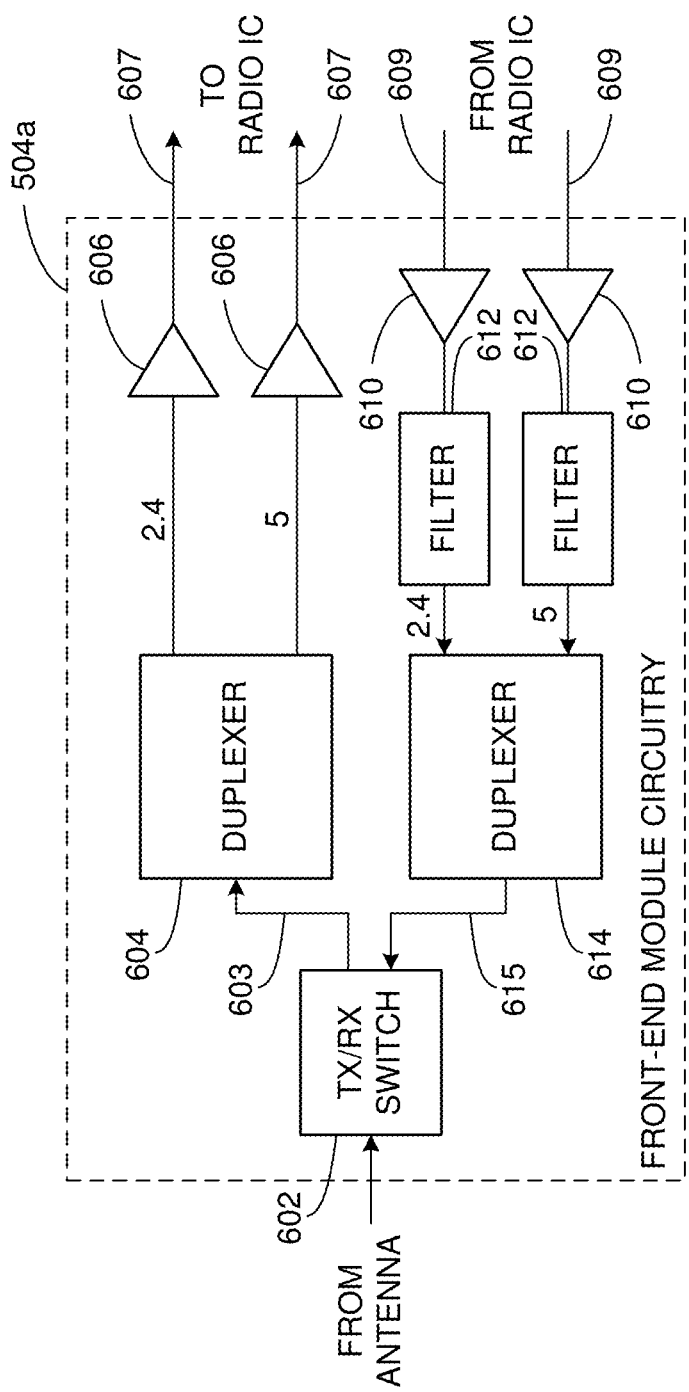
FIG. 6 illustrates an example front-end module circuitry for use in the radio architecture of FIG. 5, in accordance with one or more example embodiments of the present disclosure.

FIG. 6 illustrates WLAN FEM circuitry 504a in accordance with some embodiments. Although the example of FIG. 6 is described in conjunction with the WLAN FEM circuitry 504a, the example of FIG. 6 may be described in conjunction with the example BT FEM circuitry 504*b* (FIG. 5), although other circuitry configurations may also be suitable.

In some embodiments, the FEM circuitry 504*a* may include a TX/RX switch 602 to switch between transmit mode and receive mode operation. The FEM circuitry 504*a* may include a receive signal path and a transmit signal path. The receive signal path of the FEM circuitry 504*a* may include a low-noise amplifier (LNA) 606 to amplify received RF signals 603 and provide the amplified received RF signals 607 as an output (e.g., to the radio IC circuitry 506*a-b* (FIG. 5)). The transmit signal path of the circuitry 504*a* may include a power amplifier (PA) to amplify input RF signals 609 (e.g., provided by the radio IC circuitry 506*a-b*), and one or more filters 612, such as band-pass filters (BPFs), low-pass filters (LPFs) or other types of filters, to generate RF signals 615 for subsequent transmission (e.g., by one or more of the antennas 501 (FIG. 5)) via an example duplexer 614.

In some dual-mode embodiments for Wi-Fi communication, the FEM circuitry 504*a* may be configured to operate in either the 2.4 GHz frequency spectrum or the 5 GHz frequency spectrum. In these embodiments, the receive signal path of the FEM circuitry 504*a* may include a receive signal path duplexer 604 to separate the signals from each spectrum as well as provide a separate LNA 606 for each spectrum as shown. In these embodiments, the transmit signal path of the FEM circuitry 504*a* may also include a power amplifier 610 and a filter 612, such as a BPF, an LPF or another type of filter for each frequency spectrum and a transmit signal path duplexer 604 to provide the signals of one of the different spectrums onto a single transmit path for subsequent transmission by the one or more of the antennas 501 (FIG. 5). In some embodiments, BT communications may utilize the 2.4 GHz signal paths and may utilize the same FEM circuitry 504*a* as the one used for WLAN communications.

Figure 7:
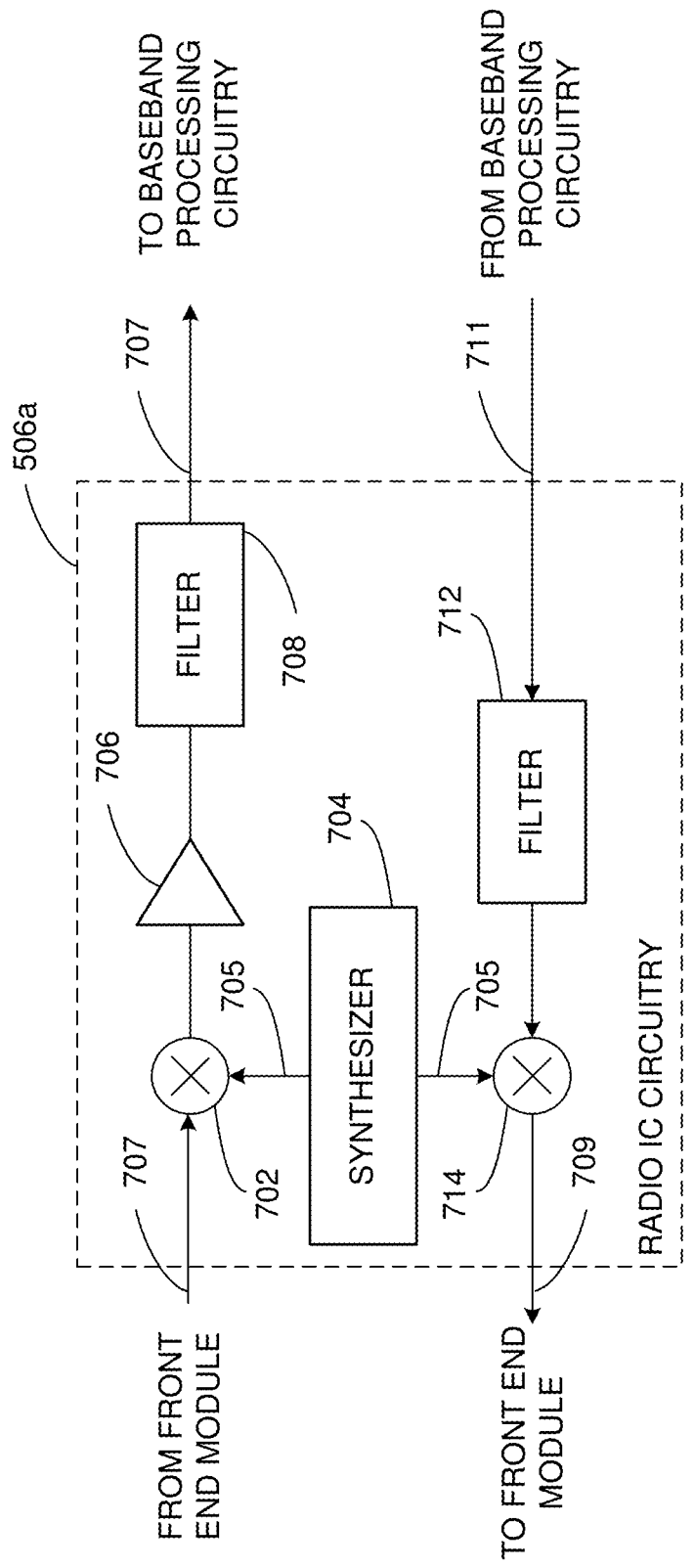
FIG. 7 illustrates an example radio IC circuitry for use in the radio architecture of FIG. 5, in accordance with one or more example embodiments of the present disclosure.

FIG. 7 illustrates radio IC circuitry 506*a* in accordance with some embodiments. The radio IC circuitry 506*a* is one example of circuitry that may be suitable for use as the WLAN or BT radio IC circuitry 506*a*/506*b* (FIG. 5), although other circuitry configurations may also be suitable. Alternatively, the example of FIG. 7 may be described in conjunction with the example BT radio IC circuitry 506*b*.

In some embodiments, the radio IC circuitry 506*a* may include a receive signal path and a transmit signal path. The receive signal path of the radio IC circuitry 506*a* may include at least mixer circuitry 702, such as, for example, down-conversion mixer circuitry, amplifier circuitry 706 and filter circuitry 708. The transmit signal path of the radio IC circuitry 506*a* may include at least filter circuitry 712 and mixer circuitry 714, such as, for example, up-conversion mixer circuitry. Radio IC circuitry 506*a* may also include synthesizer circuitry 704 for synthesizing a frequency 705 for use by the mixer circuitry 702 and the mixer circuitry 714. The mixer circuitry 702 and/or 714 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 7 illustrates only a simplified version of a radio IC circuitry, and may include, although not shown, embodiments where each of the depicted circuitries may include more than one component. For instance, mixer circuitry 714 may each include one or more mixers, and filter circuitries 708 and/or 712 may each include one or more filters, such as one or more BPFs and/or LPFs according to application needs. For example, when mixer circuitries are of the direct-conversion type, they may each include two or more mixers.

In some embodiments, mixer circuitry 702 may be configured to down-convert RF signals 607 received from the FEM circuitry 504*a-b* (FIG. 5) based on the synthesized frequency 705 provided by synthesizer circuitry 704. The amplifier circuitry 706 may be configured to amplify the down-converted signals and the filter circuitry 708 may include an LPF configured to remove unwanted signals from the down-converted signals to generate output baseband signals 707. Output baseband signals 707 may be provided to the baseband processing circuitry 508*a-b* (FIG. 5) for further processing. In some embodiments, the output baseband signals 707 may be zero-frequency baseband signals, although this is not a requirement. In some embodiments, mixer circuitry 702 may comprise passive mixers, although the scope of the embodiments is not limited in this respect.

In some embodiments, the mixer circuitry 714 may be configured to up-convert input baseband signals 711 based on the synthesized frequency 705 provided by the synthesizer circuitry 704 to generate RF output signals 609 for the FEM circuitry 504*a-b*. The baseband signals 711 may be provided by the baseband processing circuitry 508*a-b* and may be filtered by filter circuitry 712. The filter circuitry 712 may include an LPF or a BPF, although the scope of the embodiments is not limited in this respect.

In some embodiments, the mixer circuitry 702 and the mixer circuitry 714 may each include two or more mixers and may be arranged for quadrature down-conversion and/or up-conversion respectively with the help of synthesizer 704. In some embodiments, the mixer circuitry 702 and the mixer circuitry 714 may each include two or more mixers each configured for image rejection (e.g., Hartley image rejection). In some embodiments, the mixer circuitry 702 and the mixer circuitry 714 may be arranged for direct down-conversion and/or direct up-conversion, respectively. In some embodiments, the mixer circuitry 702 and the mixer circuitry 714 may be configured for super-heterodyne operation, although this is not a requirement.

Mixer circuitry 702 may comprise, according to one embodiment: quadrature passive mixers (e.g., for the in-phase (I) and quadrature phase (Q) paths). In such an embodiment, RF input signal 607 from FIG. 7 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 705 of synthesizer 704 (FIG. 7). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction in power consumption.

The RF input signal 607 (FIG. 6) may comprise a balanced signal, although the scope of the embodiments is not limited in this respect. The I and Q baseband output signals may be provided to low-noise amplifier, such as amplifier circuitry 706 (FIG. 7) or to filter circuitry 708 (FIG. 7).

In some embodiments, the output baseband signals 707 and the input baseband signals 711 may be analog baseband signals, although the scope of the embodiments is not limited in this respect. In some alternate embodiments, the output baseband signals 707 and the input baseband signals 711 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 704 may be a fractional-N synthesizer or a fractional N/N+1 synthesizer, although the scope of the embodiments is not limited in this respect as other types of frequency synthesizers may be suitable. For example, synthesizer circuitry 704 may be a delta-sigma synthesizer, a frequency multiplier, or a synthesizer comprising a phase-locked loop with a frequency divider. According to some embodiments, the synthesizer circuitry 704 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 704 may be provided by a voltage controlled oscillator (VCO), although that is not a requirement. A divider control input may further be provided by either the baseband processing circuitry 508a-b (FIG. 5) depending on the desired output frequency 705. In some embodiments, a divider control input (e.g., N) may be determined from a look-up table (e.g., within a Wi-Fi card) based on a channel number and a channel center frequency as determined or indicated by the example application processor 510. The application processor 510 may include, or otherwise be connected to, one of the example secure signal converter 101 or the example received signal converter 103 (e.g., depending on which device the example radio architecture is implemented in).

In some embodiments, synthesizer circuitry 704 may be configured to generate a carrier frequency as the output frequency 705, while in other embodiments, the output frequency 705 may be a fraction of the carrier frequency (e.g., one-half the carrier frequency, one-third the carrier frequency). In some embodiments, the output frequency 705 may be a LO frequency (fLO).

Figure 8:
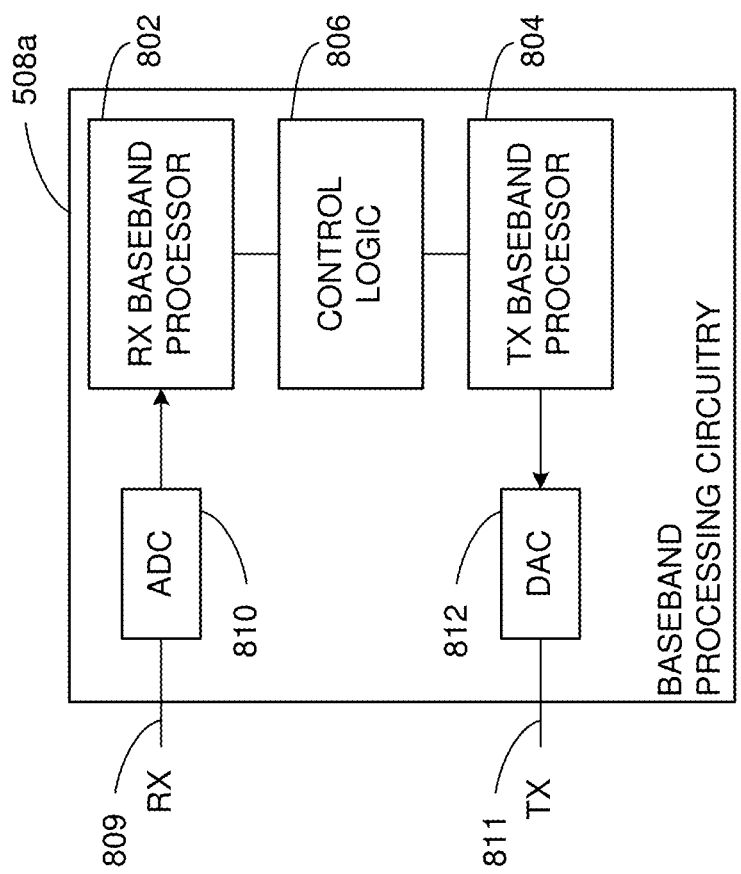
FIG. 8 illustrates an example baseband processing circuitry for use in the radio architecture of FIG. 5, in accordance with one or more example embodiments of the present disclosure.

FIG. 8 illustrates a functional block diagram of baseband processing circuitry 508a in accordance with some embodiments. The baseband processing circuitry 508a is one example of circuitry that may be suitable for use as the baseband processing circuitry 508a (FIG. 5), although other circuitry configurations may also be suitable. Alternatively, the example of FIG. 7 may be used to implement the example BT baseband processing circuitry 508b of FIG. 5.

The baseband processing circuitry 508a may include a receive baseband processor (RX BBP) 802 for processing receive baseband signals 709 provided by the radio IC circuitry 506a-b (FIG. 5) and a transmit baseband processor (TX BBP) 804 for generating transmit baseband signals 711 for the radio IC circuitry 506a-b. The baseband processing circuitry 508a may also include control logic 806 for coordinating the operations of the baseband processing circuitry 508a.

In some embodiments (e.g., when analog baseband signals are exchanged between the baseband processing circuitry 508a-b and the radio IC circuitry 506a-b), the baseband processing circuitry 508a may include ADC 810 to convert analog baseband signals 809 received from the radio IC circuitry 506a-b to digital baseband signals for processing by the RX BBP 802. In these embodiments, the baseband processing circuitry 508a may also include DAC 812 to convert digital baseband signals from the TX BBP 804 to analog baseband signals 811.

In some embodiments that communicate OFDM signals or OFDMA signals, such as through baseband processor 508a, the transmit baseband processor 804 may be configured to generate OFDM or OFDMA signals as appropriate for transmission by performing an inverse fast Fourier transform (IFFT). The receive baseband processor 802 may be configured to process received OFDM signals or OFDMA signals by performing an FFT. In some embodiments, the receive baseband processor 802 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 5, in some embodiments, the antennas 501 (FIG. 5) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 501 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

What is claimed is:

1. A device comprising: processing circuitry coupled to storage, the processing circuitry configured to:
generate a request frame comprising at least one of a first indication of a bandwidth for which a second device is to measure a first noise level or a second indication of a resource unit for which the second device is to measure a second noise level during a short inter-frame space (SIFS) time before transmission of a response frame, wherein the request frame is sent via an request to send (RTS) and includes parameters for upcoming transmissions;

cause to send the request frame to the second device, wherein the request frame further comprises a directive for the second device to measure a signal to interference plus noise ratio (SINR) gap in addition to the first noise level or the second noise level;

identify the response frame received from the second device, the response frame comprising a third indication of the first noise level or the second noise level and the SINR gap, wherein the SINR gap is determined by comparing a SINR measurement taken immediately before transmission of the response frame with a minimum SINR threshold for decoding the request frame, and a fourth indication of the bandwidth or the resource unit; and determine, based on the first noise level or the second noise level, and the SINR gap, a parameter associated with a subsequent frame to send to the second device.

2. The device of claim 1, wherein the request frame is a Request-to-Send (RTS) frame.

3. The device of claim 2, wherein a Frame Control field of a medium access control (MAC) layer header of the RTS frame comprises the fourth indication, and wherein the fourth indication is associated with a single 20 MHz channel.

4. The device of claim 2, wherein the RTS frame comprises one or more orthogonal frequency-division multiplexing (OFDM) symbols after a Signature field of the RTS frame, the one or more OFDM symbols comprising a cyclic redundancy check (CRC) and a tail bit, wherein the one or more OFDM symbols are readable by Extremely High Throughput (EHT) devices and are not readable by non-EHT devices.

5. The device of claim 1, wherein the request frame is a multi-user (MU) RTS frame further comprising a fifth indication of the second device and a sixth indication of a third device to measure a third noise level.

6. The device of claim 1, wherein the request frame is a trigger frame.

7. The device of claim 1, wherein the request frame is a management frame or a control frame.

8. The device of claim 1, wherein the response frame is a Clear-to-Send (CTS) frame.

9. The device of claim 1, wherein the response frame is a High Efficiency (HE) physical layer protocol data unit (PPDU) comprising an A-Control subfield, and wherein the third indication and the fourth indication are included in the A-Control subfield.

10. The device of claim 1, wherein the parameter comprises at least one of the bandwidths, a modulation and coding scheme (MCS), a number of spatial streams, or the resource unit.

11. The device of claim 1, wherein the bandwidth is a first bandwidth that consists of 20 MHz, wherein the request frame further comprises a fifth indication of a second bandwidth that consists of another 20 MHz.

12. The device of claim 1, wherein the first noise level or the second noise level is measured during an interframe space time preceding transmission of the response frame.

13. The device of claim 1, wherein the request frame is a MU-RTS frame, and wherein the response frame is an HE PPDU.

14. The device of claim 1, wherein the bandwidth is associated with a primary communication channel, and wherein the response frame indicates that the first noise level or the second noise level satisfies a noise threshold greater than-82 dbM.

15. The device of claim 1, further comprising a transceiver configured to transmit and receive wireless signals comprising at least one of the request frame or the response frame.

16. The device of claim 15, further comprising an antenna coupled to the transceiver to cause to send the wireless signals.

17. A non-transitory computer-readable medium storing computer-executable instructions which when executed by one or more processors result in performing operations comprising:

identifying, by a first device, a request frame received from a second device;

determining that the request frame comprises at least one of a first indication of a bandwidth for which the first device is to measure a first noise level or a second indication of a resource unit for which the first device is to measure a second noise level, wherein the request frame further comprises a directive for the second device to measure a signal to interference plus noise ratio (SINR) gap in addition to the first noise level or the second noise level;

determining at least one of the first noise level or the second noise level during a short inter-frame space (SIFS) time preceding transmission of a response frame;

generating the response frame, the response frame comprising a third indication of the first noise level or the second noise level and the SINR gap, wherein the SINR gap is determined by comparing a SINR measurement taken immediately before transmission of the response frame with a minimum SINR threshold for decoding the request frame, and a fourth indication of the bandwidth or the resource unit; and causing to send the response frame to the second device.

18. The non-transitory computer-readable medium of claim 17, wherein the request frame is a Request-to-Send (RTS) frame, and wherein the response frame is a Clear-to-Send (CTS) frame, a High Efficiency (HE) physical layer protocol data unit (PPDU), a management frame, or a control frame.

19. A method for requesting and performing noise measurements for wireless communications, the method comprising:

generating, by processing circuitry of a first device, a request frame comprising at least one of a first indication of a bandwidth for which a second device is to measure a first noise level or a second indication of a resource unit for which the second device is to measure a second noise level during a short inter-frame space (SIFS) time before transmission of a response frame, wherein the request frame is sent via an request to send (RTS) and includes parameters for upcoming transmissions;

causing to send, by the processing circuitry, the request frame to the second device, wherein the request frame further comprises a directive for the second device to measure a signal to interference plus noise ratio (SINR) gap in addition to the first noise level or the second noise level;

identifying, by the processing circuitry, the response frame received from the second device, the response frame comprising a third indication of the first noise level or the second noise level and the SINR gap, wherein the SINR gap is determined by comparing a SINR measurement taken immediately before transmission of the response frame with a minimum SINR threshold for decoding the request frame, and a fourth indication of the bandwidth or the resource unit; and determining, by the processing circuitry, based on the first noise level or the second noise level, and the SINR gap, a parameter associated with a subsequent frame to send to the second device.

20. The method of claim 19, wherein the request frame is a Request-to-Send (RTS) frame, and wherein the response frame is a Clear-to-Send (CTS) frame, a High Efficiency (HE) physical layer protocol data unit (PPDU), a management frame, or a control frame.

* * * * *